(12) United States Patent
Murguia Cosentino et al.

(10) Patent No.: US 10,873,448 B2
(45) Date of Patent: Dec. 22, 2020

(54) TECHNIQUE TO GENERATE SYMMETRIC ENCRYPTION ALGORITHMS

(71) Applicants: Agustin Murguia Cosentino, Montevideo (UY); Santiago Murguia Cosentino, Montevideo (UY); Julian Murguia Hughes, Montevideo (UY)

(72) Inventors: Agustin Murguia Cosentino, Montevideo (UY); Santiago Murguia Cosentino, Montevideo (UY); Julian Murguia Hughes, Montevideo (UY)

( * ) Notice: Subject to any disclaimer, the term of this patent is extended or adjusted under 35 U.S.C. 154(b) by 163 days.

(21) Appl. No.: 15/777,209

(22) PCT Filed: Nov. 28, 2016

(86) PCT No.: PCT/IB2016/057159
§ 371 (c)(1),
(2) Date: May 17, 2018

(87) PCT Pub. No.: WO2017/090014
PCT Pub. Date: Jun. 1, 2017

(65) Prior Publication Data
US 2018/0375641 A1    Dec. 27, 2018

(30) Foreign Application Priority Data

Nov. 27, 2015 (UY) .......................................... 36412

(51) Int. Cl.
*H04L 9/06* (2006.01)
*H04L 9/14* (2006.01)
*G09C 1/00* (2006.01)

(52) U.S. Cl.
CPC .............. *H04L 9/0618* (2013.01); *G09C 1/00* (2013.01); *H04L 9/14* (2013.01); *H04L 2209/56* (2013.01)

(58) Field of Classification Search
CPC ..... H04L 9/0618; H04L 9/14; H04L 2209/56; H04L 63/045; H04L 9/16; G09C 1/00
See application file for complete search history.

(56) References Cited

U.S. PATENT DOCUMENTS

| | | | | |
|---|---|---|---|---|
| 1,310,719 A | * | 7/1919 | Vernam | H04K 1/00 380/33 |
| 1,416,765 A | * | 5/1922 | Vernam | H04L 9/38 380/27 |
| 1,584,749 A | * | 5/1926 | Vernam | G09C 5/00 380/59 |
| 4,979,832 A | * | 12/1990 | Ritter | H04L 9/002 380/28 |
| 5,003,596 A | | 3/1991 | Wood | |
| 8,688,996 B2 | * | 4/2014 | Livesey | H04L 9/0656 713/150 |
| 8,949,377 B2 | * | 2/2015 | Makar | G06Q 30/02 709/219 |
| 2003/0118185 A1 | * | 6/2003 | Lambert | H04L 9/001 380/263 |
| 2011/0069834 A1 | * | 3/2011 | Urbanik | H04L 9/0618 380/28 |
| 2013/0308774 A1 | * | 11/2013 | Parrish | G09C 1/00 380/28 |

FOREIGN PATENT DOCUMENTS

WO    WO-2012152956 A1 * 11/2012 ........... H04L 9/0618
WO    WO-2013110826 A1 *  8/2013 ............. G06F 21/62

OTHER PUBLICATIONS

ISA: European Patent Office, NL; Feb. 15, 2017.
Tarman TD et Al. : Algorithm-agile encryption in ATM Networks; Sep. 1998.
Valizadeh A et Al.: "A reconfigurable architecture for implementing multiple cipher algorithms"—2005.

* cited by examiner

*Primary Examiner* — Ellen Tran
(74) *Attorney, Agent, or Firm* — Patshegen IP LLC; Moshe Pinchas

(57) ABSTRACT

An invention aimed at keeping in a secret and indecipherable form any type of information or data that can be stored, transmitted, displayed or expressed by any means or format, regardless of what its content or purpose may be and to keep the original information inaccessible to unauthorized persons, by means of a cryptographic technique, procedure or process of encryption widely applicable, either physically (hardware), logically (software) or mixed (Firmware) and other forms that may be created in the future. This protected Invention defines a technique, process or procedure for generating multiple encryption or ciphering algorithms with industrial application in both private and public sectors in the areas of national defense, telecommunications, computer science, computer programs, banking and electronic payment transactions, encryption or ciphering of still images, moving images and sounds, in their storage or transmission Including but not limited to the detailed areas, being this list illustrative and not limitative.

5 Claims, No Drawings

TECHNIQUE TO GENERATE SYMMETRIC ENCRYPTION ALGORITHMS

TECHNICAL DEFINITION

The invention protected by this patent consists of a procedure, process or technique to generate multiple symmetric cryptographic algorithms where on each of them the plain text is ciphered and the cipher text is deciphered through the use of multiple independent ciphering routines or algorithms, which will be used upon different portions of the data to be processed.

The invention protected by this patent consists of a cryptographic technique or procedure that is independent of the number and/or complexity of the different algorithms to be used. At the time of implementing this technique into a practical application, the specific algorithms to be used and how will they be used will be specified.

The invention protected by this patent consists of a cryptographic technique, procedure or process that possess no limitation on the sizes of the plain text, the cipher text, the key or the portions of them used during the process.

The invention protected by this patent consists of a cryptographic technique, procedure or process that allows the use of additional parameters to specify which ciphering routine or algorithm will be used on each instance of the procedure to process each portion of the plain text, the cipher text or the key.

More and more measures to protect information and data privacy to keep it out of the reach of unauthorized people or make it unintelligible in case it is accessed are required and growing in demand nowadays.

STATE OF THE ART

Since the beginning, all cryptography including both, symmetric and asymmetric (public key), is based on the use of a single algorithm and the security is measured upon the complexity of the algorithm used and on the length and how random the key used is.

Historically, cryptography has used, and still uses today, the same logic of the process.

All the cryptography in use today is based on the use of a single algorithm which receives as parameters the plain text and the key for the ciphering process and the cipher text and the key for the reverse deciphering process.

It has been so since the Caesar's cipher, passing by Vernam or Vignére up to the current standards like AES. Only the complexity of the algorithms or their repetition (Triple DES, TwoFish, ThreeFish, etc.) has changed. This complexity augmentation has resulted in slowering the ciphering processes, something that has been partially compensated with the growing of the computational power offered by modern computers.

What has never changed is the logic of the process. Given the same plain text, same key and the same algorithm, the result will always be the same.

The most common algorithms and cryptographic protocols considered as standards and which, therefore, can be considered as accredited, by way of illustration and not limitation, are the following:

a) TDEA (Triple Data Encryption Algorithm, Triple Algoritmo de Cifrado de Datos): SP 800-20, SP800-38B y SP 800-67 del NIST ([NIST, SP800-20], [NIST, SP800-38B], [NIST, SP800-67]).
b) AES (Advanced Data Encryption, Cifrado de Datos Avanzado): FIPS 197 y SP800-38B del NIST ([NIST, FIPS197], [NIST, SP800-38B]) and NSA's Suite B ([NSA, SuiteB]).
c) DH o DHKA (Diffie-Hellman Key Agreement, Acuerdo de Clave de Diffie-Hellman): ANSI X9.42 ([ANSI, X9.42]) and PKCS #3 from RSA Labs ([RSALab, 1993]).
d) MQV (Menezes-Qu-Vanstone Key Agreement, Acuerdo de Clave de Menezes-Qu-Vanstone): ANSI X9.42 ([ANSI, X9.42]), ANSI X9.63 ([ANSI, X9.63]) and IEEE 1 363 [IEEE, 1363].
e) ECDH (Elliptic Curve Diffie-Hellman, Acuerdo de Clave de Diffie-Hellman con Curvas Elípticas): ANSI X9.63 ([ANSI, X9.63]), IEEE1 363 ([IEEE, 1 363]), IEEE1 363a ([IEEE, 1363a]) and NSA's Suite B ([NSA, SuiteB]).
f) ECMQV (Elliptic Curve Menezes-Qu-Vanstone, Acuerdo de Clave de Menezes-Qu-Vanstone con Curvas Elípticas): NSA's Suite B ([NSA, SuiteB]) and SECG's SEC 1 ([SECG, SEC1]).
g) DSA (Digital Signature Algorithm, Algoritmo de Firma Digital): ANSI X9.30 ([ANSI, X9.30-1]), FIPS 186-2 ([NIST, FIPS186-2]) and FIPS 1 86-3 ([NIST, FIPS1 86-3]).
h) ECDSA (Elliptic Curve Digital Signature Algorithm, Algoritmo de Firma Digital con Curvas Elípticas): ANSI X9.62 ([ANSI, X9.62]), FIPS 1 86-2 ([NIST, FIPS186-2]), SP 800-57A from NIST ([NIST, SP800-57A]), NSA's Suite B ([NSA, SuiteB]) and SECG's SEC 1 ([SECG, SEC1]).
i) RSA (RSA cryptosysten, Criptosistema RSA): ANSI X9.44 ([ANSI, X9.44]), FIPS 186-2 ([NIST, FIPS1 86-2]) and PKCS #1 from RSA Labs ([RSALab, 2002]).
j) ECI ES (Elliptic Curve Integrated Encryption Scheme, Esquema de Cifrado Integrado con Curvas Elípticas): ANSI X9.63 ([ANSI, X9.63]), I EEE1363a ([IEEE, 1363a]) and ISO 1 8033-2 ([ISOIEC, 18033-2]).
k) SHA (Secure Hash Algorithm, Algoritmo Resumen Seguro): FIPS180-1 ([NIST, FIPS180-1]), NSA's Suite B ([NSA, SuiteB]) and FIPS1 80-2 ([NIST, FIPS 180-2]).
l) HMAC (Hash Message Authentication Code, Código de Autenticación de Mensaje con Resumen): ANSI X9 71 ([ANSI, X9.71]) and FIPS 198 ([NIST, FIPS198]).

OTHER PATENTS

From the search in different patent databases, the following patents related to data ciphering have been found:

Patent/Request U.S. Pat. No. 1,310,719 A, Vernam cipher. Is a single ciphering algorithm and has no relation with the invention protected by this patent.

Patent/Request U.S. Pat. No. 1,416,765 A, Ciphering Device. Describes a device to implement Vernam's cipher. Is a device that uses a single ciphering algorithm and has no relation with the invention protected by this patent.

Patent/Request U.S. Pat. No. 1,584,749 A Ciphering Device. Describes a device to implement Vernam's cipher. Is a device that uses a single ciphering algorithm and has no relation with the invention protected by this patent.

Patent/Request U.S. Pat. No. 8,688,996 B2, Multipad encryption. Describes a four step process where the plain text is ciphered using a key, then it's sent to the addressee who ciphers it using a second key and sends it back to the sender who deciphers it using his key and sends the result to the addressee who deciphers it using his key obtaining the original plain text. Is a single ciphering algorithm and has no relation with the invention protected by this patent.

Patent/Request U.S. Pat. No. 8,948,377 B2, Encryption device, encryption system, encryption method, and encryption program. Describes the usage of the Vernam cipher (One Time Pad—OTP) interleaved with a block cipher using the OTP key to decide which one to use. The logic of the process has no relation with the invention protected by this patent.

Patent/Request U.S. Pat. No. 4,979,832 A, Dynamic substitution combiner and extractor. Describes a single algorithm with multiple substitution tables and has no relation with the invention protected by this patent.

Patent/Request WO 2004034632 A1, Method and system for data encryption and decryption. Describes a method and system for data ciphering and deciphering using relative displacements in an array hidden within poly-alphabetic substitutions and a multiple distance chaining scheme. It has no relation with the invention protected by this patent.

Patent/Request WO 2012152956 A1, Procedimiento de doble criptograma simétrico de seguridad de Shannon por codificación de información para transmisión telemática y electrónica. (Shannon's doublé symmetric security cryptogram for encoding information for telemátic and electronic transmission). Describes the sequential use of an alphanumeric matrix, a numerical residual base matrix, an equivalence key, an equivalence table, a reduced residual or form cryptogram, a protocol key, a ciphering algorithm, a final residue cryptogram and a decoding algorithm. It has no relation with the invention protected by this patent.

Patent/Request WO 2013110826 A1, Encriptación de datos mediante algoritmo de encriptación de parámetros externos. (Data ciphering through an external parameter ciphering algorithm). Describes a Client-Server software solution with different security levels where the operational parameters and/or the ciphering/deciphering algorithm are stored only at the server. It has no relation with the invention protected by this patent.

INVENTION

The invention protected by this patent changes the logic of the process. It starts out from using multiple different ciphering processes, functions or algorithms instead of a single one.

Each ciphering function or algorithm will have a reverse deciphering function or algorithm and they can be used indistinctly. That means that the deciphering function or algorithm can be used to generate the cipher text and the ciphering one used to recover the original plain text portion.

From now on, any mention or reference to a ciphering function or algorithm also includes any deciphering function or algorithm.

The invention protected by this patent consists of a non-mathematical method that incorporates functions or algorithms and formulas that control the process of encryption and decryption but applies them through a technique that improves the security of the generated cipher text. This invention presents functional and palpable applications in the field of computer technology with applications and improvements specific to the technologies existing in the market, but not limited to them.

The invention protected by this patent consists of a technique that does not depend, neither in general nor in particular, on the number, the quantity or the complexity of the functions or algorithms it can use, nor on the functions or algorithms themselves.

One proposed solution is to use a second parameter, additional to the key, which will define on each instance which of the available algorithms will be used to process certain data portion from the plain text or the cipher text and the key. For practical purposes and to simplify the explanation and understanding of the technique or process, we will call method to the second parameter that will indicate in each instance which of the available functions or algorithms will be used to to process the data portion from the plain text or the cipher text and the key.

The invention protected by this patent ensures that the same plain text and same key will not always produce the same cipher text as result, increasing the security and privacy of what is protected. The use of different methods with the same plain text and key may result in obtaining different cipher texts.

The following diagram shows the basic behavior of the technique or process:

```
Read or receive a portion of the plain text or the cipher text
If not reached the end
    Read or receive a portion of the key
    Read or receive a portion of the method
    Algorithm = function(method)
    If ciphering
        Cipher text portion = Algorithm(plain text, key)
    If not
        Plain text portion = Algorithm(cipher text, key)
    End if
Finished
```

Having multiple ciphering algorithms or processes implies the need to identify and differentiate them; each one has to have an identification to differentiate it from the rest.

While the method may indicate in different ways which of the processes, functions or algorithms of encryption should be used, and is not limited to any particular, for the purposes of explanation, we will consider that we will have a list of such processes, functions or Algorithms and that the method will indicate the place in said list of the process, function or algorithm to be used; This example is illustrative and not limiting.

Although the technique allows to process portions of the plain text, cipher text and key of any length and without the need for a relationship between these lengths, depending only on how the same is implemented, in order to simplify the explanation of the technique, we will use examples that consider the portions to be processed of both plaintext, cipher text, and key as 8-bit bytes. These examples are illustrative and not limiting.

As an example, if we consider the portion of the method as an 8-bit set, ie a byte. Since each byte can represent 256 different values, this implies the possibility of using up to 256 different encryption functions or algorithms to process the portion of the plain text and the portion of the key.

That is, for each portion of the plaintext and for key portion, the encryption process would take a byte of the method and depending on its value, would decide which encryption function or algorithm would be used to generate the cipher text portion. In this way, the cipher text does not provide absolutely any clue about the plain text, the key or the method or the function or algorithm used.

Assuming that 256 different encryption functions or algorithms are used and the method indicates the position in the list of the process or algorithm to be used, we must consider that those 256 functions or algorithms can be ordered in 256! (Factorial of 256) different ways in that list:

$$256!=8.5781777534284265411908227168123262515778152027948561985\ldots\times10^{506}$$

Given that once the technique is implemented in a practical solution, the order of the algorithms will remain fixed for that implementation, a third parameter can be added that allows to vary the order of the listing.

This third parameter would be a sequence of values that would represent one of the possible sorts of the listing. Using our example of 256 different functions or algorithms, this third parameter would be one of the possible ordering of values from 0 to 255. In this way, the method would point to a position within this order and the value at that position would indicate the order in the internal listing of the process or algorithm to be used to encrypt the plaintext or decrypt the cipher text using the key.

For example, if the value of the method portion represents the value 59, this indicates that the process or algorithm located at that position of the internal listing will be used; But if we use that third parameter, the value 59 will indicate the position within that parameter of the value that we will use as position in the internal listing, which may or may not be the same; This example is illustrative and not limiting.

This third parameter may also be used to exclude and not use certain functions or algorithms during the encryption or decryption process. This can be achieved by omitting the specific values corresponding to those algorithms in the internal listing. This example is illustrative and not limiting.

The application of the technique comprises several components:

a. Component 1 (Use multiple ciphering functions or algorithms)

Each function or algorithm will take a byte from the plain text and one from the key and will return a byte from the cipher text, returning a different value for each possible key byte value.

We will explain three of these functions or algorithms. These examples are illustrative and not limiting:

Modular Addition

Will add the values represented by the plain text byte and the key byte and if the result is equal or larger than the module, it will subtract the module value from the total returning the new result as the byt value for the cipher text byte.

Given T is the plain text byte, K is the key byte, C is the cipher text byte and the module is 256, we can express:

$$C=(T+K)\text{MOD}(256)$$

That is:
C=T+K
If C>255, then C=C−256

Modular Subtraction

Will subtract the value represented by the key byte from the value represented by the plain text byte and if the result is less than zero, it will add the module value to the total, returning the new result as the byte value for the cipher text byte.

Given T is the plain text byte, K is the key byte, C is the cipher text byte and the module is 256, we can express:

$$C=(T-K)\text{MOD}(256)$$

That is:
C=T−K
If C<0, then C=C+256

Converse Modular SUbtraction

Will subtract the value represented by the plain text byte from the value represented by the key byte and if the result is less than zero, it will add the module value to the total, returning the new result as the byte value for the cipher text byte.

Given T is the plain text byte, K is the key byte, C is the cipher text byte and the module is 256, we can express:

$$C=(K-T)\text{MOD}(256)$$

That is:
C=K−T
If C<0, then C=C+256

These examples are illustrative and not limiting. Any other function or algorithm that returns a value between 0 and 255 from the key text byte and key byte values and returns different results for the different possible byte values of the key, is equally valid. Two functions or algorithms that return different results for the same value of the plain text byte and the byte of the key are considered different. Functions or algorithms that return different results for two or more pair of values for the plain text and the key byte.

It is easy to see that from any valid function or algorithm you can get as many different functions as the value of the module.

For example, If we express the modular addition in the following way:

Given T is the plain text byte, K is the key byte, C is the cipher text byte, the module is 256 and M is an integer value between 0 and 255, we can express:

$$C=(T+K+M)\text{MOD}(256)$$

That is:
C=T+K+M
While C>255
C=C−256
End while

Is easy to prove that if we have two different values M≠M', then we can say that: (T+K+M)MOD(256) ≠(T+K+M')MOD(256) and so C≠C'.

The same applies to any other valid function or algorithm.

b. Component 2 (Use a second parameter)

The second parameter will indicate on each instance which of the available functions or algorithms will be used to obtain the cipher text byte from the plain text byte and the key byte.

c. Component 3 (Order of the functions or algorithms)

When we have multiple functions or encryption algorithms, we must identify and order them in some way. Usually, a list is used and the order in that list will be used to define which of the functions or algorithms will be used in each instance, depending on the value provided by the second parameter. And this list is not unique; Given N functions or different algorithms, can be ordered in N! Different orders (N!=1×2×3× . . . N). In our example, we will have 256! Different orders for a given group of 256 different functions.

d. Component 4 (Change the order of the functions)
   So far, a given value X of the second parameter will always cause the Z function to be executed to obtain the byte of the cipher text from the byte of the plain text and the byte of the key.
   We will use a third parameter, which will be an array containing one of the possible orders of the functions or algorithms. In our example, it will contain one of 256! possible orders of values from 0 to 255.
   Now the second parameter will be used to indicate which element of that array contains the value to be used to identify the function or algorithm that will be used to obtain the byte of the cipher text from the byte of the plain text and the byte of the key.
   Changing the order of the elements of the array will cause the same value of the second parameter to point to the same element of the array that will now have a different value and therefore the function or algorithm to be used in that instance will be another one.
e. Component 5 (Block Processing)
   Let's take a block or set of bytes of a given length from the plain text and process it in reverse order, starting from the last byte of the block, processing it and saving the result as the first byte of the cipher text. We will continue with the penultimate byte of the plain text, processing it and saving it as the second byte of the cipher text. The process will continue until the first byte of the block have been processed and then continue with the next block.
   The last block may be shorter but it will be processed the same way, from its last byte to the first.
   A fourth parameter will define the length of the blocks to be processed. If that parameter is a single value, it will indicate a fixed block size to use and if it is a sequence of values, it will indicate the successive sizes for each block to be processed.
   The same can be used to process the key and/or method. This can be defined during the implementation of the application of the technique or the user can be given the option of deciding how to proceed.
f. Component 6 (Mapping of possible values)
   If, using our example, each of the 256 possible values of a byte correspond to a valid value within the possible values for each byte of the plain text, then we have three possible ways of proceeding:
   1. The current value of the plain text byte is taken to be used as the value to generate the cipher text byte.
   2. An array with one of the possible sorts of values from 0 to 255 is used and the value of the byte from the plain text is used to point to the element of the array whose value will be used instead of the value of the Byte of plaintext to generate the cipher text byte.
   3. An array with one of the possible sorts of values from 0 to 255 is used, and the location of the text byte value within the array is used instead of the text byte value to generate the cipher text byte.
   The decision of the option or mixture of options to be used can be defined when applying the technique or left as an external parameter at the user's option.
   If, using our example, not all 256 possible one-byte values correspond to a valid value within the possible values for each byte of the plain text, then we can proceed as follows:
   1. An array is used with one of the possible sorts of valid values and the location of the text byte value within the array is used as the value of the text byte to generate the byte of the cipher text and the total number of valid values for the text bytes is used as the Module. This will ensure that the cipher text byte value corresponds to a valid plain text byte value.
   This last component allows us to define format preserving encryption algorithms.
   If instead of using a byte (8 bits) as the size of the portion of the method we use two bytes (16 bits), the number of possible processes or algorithms is squared up to a maximum of 65536 and the possible ordering rises exponentially To 65536! (Factorial of 65536):

$$65536!=5.16294852309750916500022794327240174787669\text{-}187508469072\ldots\times 10^{287193}$$

While factorial of 256 (256!), is a value about $2^{1684}$, factorial of 65536 (65536!) is a value about $2^{954037}$.

PRACTICAL EXAMPLE

In order to simplify the understanding of the technique protected by this invention patent, we will now present a practical example of the implementation of the technique. This example is illustrative and not limiting.

As an example, we will consider the portion of the plaintext, the cipher text, the key, and the method as an 8-bit set, that is, a byte in each case.

Since each byte can represent 256 different values, this implies having up to 256 different encryption functions or algorithms, so that each possible value represents a different encryption function or algorithm to be used with the portion of the plain text and the portion of the key. That is, the encryption process, for each portion of the plaintext and for each portion of the key, would take a byte of the method and depending on its value, would decide which encryption function or algorithm would be used to generate the portion of the cipher text.

Unlike other ciphers, the process is not always the same, the process varies depending on the values of each byte of the method, the initial order of the functions or algorithms of encryption/decryption, the modifications that are made to the array with the initial order of functions and the block sizes to be processed.

If we consider that someone has access to the cipher text, it does not provide any information about the key, method or lengths, or the size of the portion of each, nor about the functions or algorithms used, neither on their order nor on the sizes of the blocks processed.

Taking any one byte of the cipher text, the corresponding byte in the original plain text can be any of them and its value is any of the 256 possible values with no indication of which one can be and all values having the same exact possibility of being the original value.

This allows different implementations of the same encryption using different sorts of ciphering functions or algorithms that result in different results for the same key and method values. You can also consider the order of the algorithms as an external parameter, a simple sequence of 256 different values in a random order. In this case, what the process does is to take the value of the byte of the method and use it as index to obtain the position within that sequence, of the value to be used to define the function or algorithm to be used. It is easy to see that the same method value will trigger a different function or algorithm if different order sequences are used. Even if you can know the 256 functions or algorithms of encryption, it remains to know which corresponds to each possible value of a byte from the method.

This implies that even if it is possible to obtain the cipher text, the key and the method, it is still necessary to know the internal order given to the functions or algorithms of encryption and the array of the initial order of the same ones (to which function or algorithm corresponds each possible value of a byte of the method) to be able to obtain the original plain text.

The process of applying the technique, by way of illustrative and non-limiting example would be:

1. It is decided which value or values of the module will be used and in what circumstances. In our example, we will consider that each byte of the plain text can have any of the 256 possible values and therefore the module will always be 256.
2. The size of each element of the method or second parameter is decided, which will indicate the number of ciphering functions or algorithms that will be used. In our example, the size of each element of the method will be 1 byte (8 bits) so that 256 encryption functions or algorithms will be used.
3. Select the 256 encryption functions or algorithms that will be used to generate an independent encryption and decryption algorithm. Using different sets of functions or algorithms will create separate encryption and decryption algorithms that will be different and generate different results.
4. These functions or algorithms are listed and ordered in a given internal order. Two different sorts will result in two different encryption and decryption algorithms.
5. Whether the plain text will be processed using a single block size or a list of sizes is defined.
6. It is defined whether the key will be processed using a single block size or a list of sizes.
7. It is defined whether a third parameter will be used or not and, if used, whether it will be internal or external.
8. Following these options, an algorithm for encryption and decryption is built up and generated. Any variation in any of the above points will determine that the independent encryption and decryption algorithm that is generated is different and provide different results for the same plain text, the same key, and the same method.

Upon completion of the application of the technique, the generated independent encryption and decryption algorithm will function, by way of illustrative and non-limiting example, as follows:

1. The user may select or enter the plaintext to cipher or the cipher text to decipher.
2. If authorized, the user may select the block size or sizes to be used to process the plain text or the cipher text.
3. The user may select or enter the key to be used.
4. If authorized, the user may select the block size or sizes to be used to process the key.
5. The user may select or enter the method or second parameter to be used.
6. If authorized, the user may select the block size or sizes to be used to process the method.
7. If authorized, the user may select the initial order of the functions or algorithms to be used.
8. The process loads the initial function order into a 256 element array.
9. If the remaining of the plaintext is shorter than the processing block, the processing block size is adjusted accordingly.
10. The process reads a processing block from the plaintext. If the plaintext has been exhausted, the process ends.
11. The process takes the last byte from the processing block.
12. The process takes a byte from the key. If the key has been exhausted, reorder the original function order array elements and read the first key byte again.
13. The process takes a byte from the second parameter. If the second parameter has been exhausted, start over from its first byte.
14. The process uses the byte from the second parameter as the index to point to an element from the function order array and uses its value to trigger an encryption function from the internal order passing the plaintext and key bytes as parameters.
15. The function triggered returns a cipher text byte that is written to the cipher text output.
16. The process takes the previous byte from the processing block. If the processing block has been exhausted, jump to step 9.
17. Jump to step 11.

The invention claimed is:

1. A method for information and data encryption or decryption
   in a mixed solution of hardware or software using multiple different encryption or ciphering processes, function or algorithms to encrypt different portions of the plaintext or decrypt different portions of the cipher text by using a key, the method comprising:
   arranging the encryption or ciphering process, function or algorithms in an array;
   dividing plaintext data or cipher text data into different labeled portions, wherein each portion can be of different sizes;
   using a first external parameter to define whether encryption or decryption will be performed;
   using a second external parameter to specify location in said array which location includes one of the available encryption or ciphering process, function or algorithm;
   using a third external parameter to specify an order of the available encryption or ciphering process, function or algorithm in said array;
   locating an encryption or ciphering process, function or algorithm located in said location corresponding to the second parameter and in accordance with said order corresponding to the third parameter;
   applying said located encryption or ciphering process, function or algorithm on said labeled portion of the cipher text or plain text;
   outputting the data after processing the cipher text or plain text.

2. The method as claimed in claim 1, characterized by the ability to be implemented as a software solution to be used by electronic devices including computers, portable devices, tablets, phones, television sets, programmable logical controllers, consoles, audio and/or video players and any other electronic device with processing capabilities.

3. The method as claimed in claim 1, characterized by the ability to be implemented as a mechanical (hardware) solution that can be integrated into any machinery or device.

4. The method as claimed in claim 1, characterized by the ability to be implemented as a mixed solution (firmware) in platforms integrating software and hardware.

5. The method as claimed in claim 1, characterized by the ability to select the algorithms manually by a user.

\* \* \* \* \*